United States Patent [19]

Wefel

[11] Patent Number: 4,647,804
[45] Date of Patent: Mar. 3, 1987

[54] HIGH SPEED GENERATOR ROTOR OIL PATH AIR VENT

[75] Inventor: Jerry D. Wefel, Rockford, Ill.

[73] Assignee: Sundstrand Corporation, Rockford, Ill.

[21] Appl. No.: 718,526

[22] Filed: Apr. 1, 1985

Related U.S. Application Data

[63] Continuation-in-part of Ser. No. 514,295, Jul. 15, 1983, abandoned.

[51] Int. Cl.[4] .............................................. H02K 1/32
[52] U.S. Cl. ........................................ 310/61; 310/56; 310/60 A; 310/64; 310/261
[58] Field of Search .................... 310/52, 53, 54, 55, 310/56, 57, 58, 59, 60 R, 60 A, 61, 64, 262, 65, 261, 264, 265, 270; 165/104.32, DIG. 24, 917

[56] References Cited

U.S. PATENT DOCUMENTS

| | | | |
|---|---|---|---|
| 2,057,196 | 10/1936 | Koch, Jr. | 310/56 |
| 2,438,872 | 3/1948 | Fuge | 310/58 |
| 3,240,967 | 3/1966 | Krastchew | 310/54 |
| 3,242,360 | 3/1966 | Carle | 310/54 |
| 3,318,253 | 5/1967 | Campolong | 310/54 |
| 3,561,564 | 2/1971 | Potter | 310/54 |
| 3,765,480 | 10/1973 | Fries | 310/61 |
| 3,826,193 | 7/1974 | Rognmo et al. | 310/58 |
| 3,922,573 | 11/1975 | Pluschke | 310/53 |
| 4,016,442 | 4/1977 | Eggemann et al. | 310/59 |
| 4,217,120 | 8/1980 | Reynolds | 55/385 R |
| 4,380,712 | 4/1983 | Intichar et al. | 310/52 |
| 4,386,289 | 5/1983 | Intichar | 310/61 |
| 4,396,847 | 8/1983 | Weghaupt et al. | 310/52 |
| 4,496,862 | 1/1985 | Weber | 310/56 |

FOREIGN PATENT DOCUMENTS 32209  11/1972  U.S.S.R. .

Primary Examiner—R. Skudy
Attorney, Agent, or Firm—Wood, Dalton, Phillips, Mason & Rowe

[57] ABSTRACT

A rotary electric machine including a stator, a rotor journalled for rotation relative to the stator about an axis of rotation and carrying electrical windings. The rotor includes a fluid inlet spaced from a fluid outlet and a cooling liquid flow path is located in the rotor interconnecting the inlet and the outlet. The liquid flow path is in heat relationship to the windings and at least a part thereof is displaced from the axis of rotation. A gas vent passage is disposed in the rotor to interconnect the inlet and the outlet and is located on the axis of rotation to thereby prevent gas bubbles tending to build from air entrained in the coolant on the axis of rotation.

6 Claims, 2 Drawing Figures

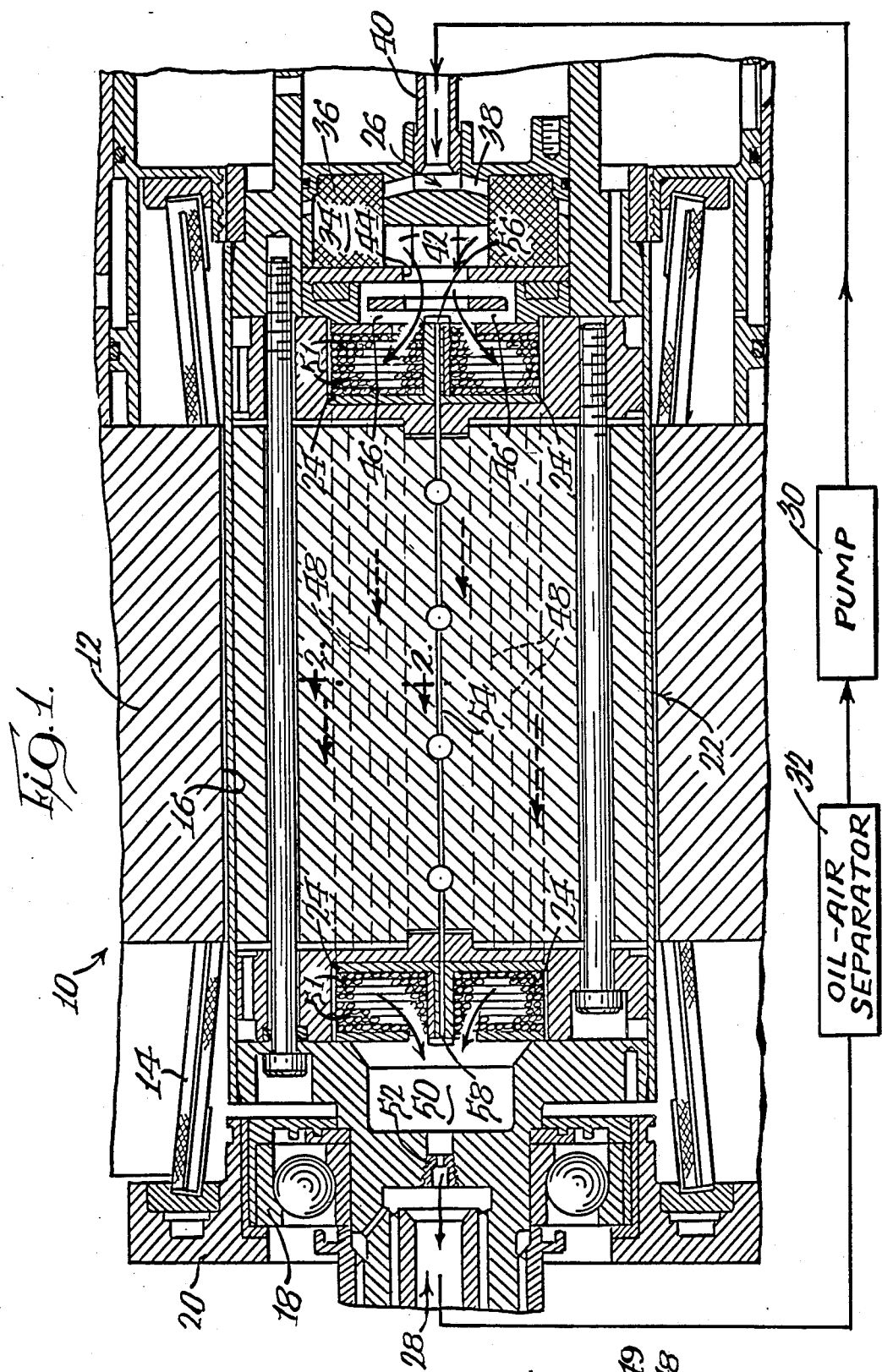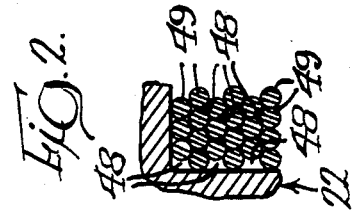

HIGH SPEED GENERATOR ROTOR OIL PATH AIR VENT

CROSS REFERENCE

This application is a continuation-in-part of my commonly assigned copending application Ser. No. 514,295, filed July 15, 1983, now abandoned.

TECHNICAL FIELD

This invention relates to rotary electric machines, and more specifically, rotary electric machines having liquid cooled rotors and an air vent path for venting air entrained in the liquid coolant.

BACKGROUND ART

In order to maximize the capacity of various rotary electric machines as, for example, generators, it is desirable to provide liquid cooling for various components such as windings. In many instances, this does not pose a particular problem. However, in the case of rotary electric machines having rotor windings requiring cooling, a problem may occur in view of the fact that the coolant, frequently oil, seldom is totally free from entrained gases such as air, and the further fact that the coolant passages are displaced from the rotational axis of the rotor.

As a consequence, during operation of the machine, the more dense oil tends to collect in the high centrifugal force field spaced from the rotational axis of the rotor while the less dense air collects in the low centrifugal force area surrounding the rotational axis of the rotor.

Since the coolant is typically introduced into the rotor by a rotary coupling located coaxial with the axis of rotation of the rotor, the air bubble located on the axis of rotation may impede or halt proper flow of the coolant to the coolant passages displaced therefrom with the undesirable result of winding overheating.

The present invention is directed to overcoming one or more of the above problems.

SUMMARY OF THE INVENTION

It is the principal object of the invention to provide a new and improved liquid cooled rotor in a rotary electric machine provided with a unique air vent to prevent the build-up of an air bubble on the axis of rotation of the rotor that might impede the flow of coolant to coolant passages.

An exemplary embodiment of the invention includes a stator with a rotor journalled for rotation relative to the stator about an axis of rotation. Electrical windings are carried by the rotor. The rotor also includes a fluid inlet and a spaced fluid outlet. Means including a cooling liquid flow path are located in the rotor to interconnect the inlet and the outlet, the liquid flow path being in heat exchange relation to the windings with at least a part thereof displaced from the axis of rotation. A gas vent passage is located in the rotor and interconnects with the liquid flow path on the axis of rotation of the rotor to thereby vent any air bubbles tending to accumulate thereat.

In a highly preferred embodiment, the vent passage is sized to prevent substantial flow of a liquid to thereby prevent bypassing of the liquid flow path due to undesirable coolant flow through the vent passage.

The invention contemplates that the inlet include a chamber with a filter disposed in the chamber along with generally radially oriented entrance and exit ports for the chamber, the exit ports connecting to both the gas vent passage and the liquid flow path.

Other objects and advantages will become apparent from the following specification taken in connection with the accompanying drawings.

BRIEF DESCRIPTION OF THE DRAWING

FIG. 1 is a sectional view of a rotary electric machine, specifically a high speed alternator, made according to the invention with certain components shown in somewhat schematic form; and FIG. 2 is a sectional view taken approximately along the line 2—2 in FIG. 1.

BEST MODE FOR CARRYING OUT THE INVENTION

An exemplary embodiment of a rotary electric machine made according to the invention is illustrated in the drawing in the form of a high speed alternator. However, it should be understood that the invention can be employed with efficacy in other types of rotary electric machines wherein rotor cooling by a liquid coolant which may entrain gases is employed. The rotary electric machine includes a stator armature, generally designated 10, having a steel core 12, windings 14, and a rotor/stator air gap 16. Bearings such as those shown at 18 mounted on a housing component 20 serve to journal a rotor, generally designated 22, for rotation relative to the stator 10 within the gap 16 for rotation about the rotor axis.

In the particular form of the machine illustrated, the alternator is of the so-called brushless variety and includes windings 24 extending from end to end of the rotor 22 as illustrated. The windings receive a direct current to generate a magnetic field which in turn rotates upon rotation of the rotor to induce current in the windings 14 of the stator 10.

The rotor includes a fluid inlet, generally designated 26, on one end and a fluid outlet, generally designated 28, on the opposite end. A fluid system including a pump 30 and an air-oil separator 32 if desired recirculate the liquid coolant from the outlet 28 to the inlet 26. A heat exchanger (not shown) for cooling the coolant may also be employed.

The inlet 26 includes a chamber 34 within the rotor. A centrifugal filter 36 is disposed in the radially outer part of the chamber 34. Generally radially extending extrance ports 38 interconnect the chamber 34 and the exit end of a tube 40 connected to the pump 30 by means including a rotary coupling.

Axially inwardly of the ports 38, the chamber 34 opens radially inwardly in exit ports 42 to a centrally apertured plate 44, the aperture in the plate 44 being concentric with the rotational axis of the rotor 22.

Radial passages 46 extend generally radially outwardly from the rotational axis to allow liquid to flow into heat exchange relationship with the end turns of the windings 24 and through passages 48 extending axially along the rotor to the opposite end turns whereat the coolant may emerge in a central chamber 50 concentric about the rotational axis of the rotor 22. The axial passages 48 may be defined by the interstices between axially extending turns 49 of the winding 24 as shown in FIG. 2. Alternatively, or additionally, the passages may be in the form of axial bores in the rotor iron. In either event, the end turns 51 of the winding are in fluid communication with the radial passages 46 and the central chamber 50 as shown by arrows in FIG. 1 allowing the coolant to enter the interstices between adjacent turns and then flow to the axial passages 48. Conventional spacers (not shown) may be disposed between end turns to aid such entry. A flow path including an orifice 52 interconnects the chamber 50 with the outlet 28.

As noted previously, the difference in densities between the coolant, usually oil, and gas, usually air entrained therein tends to cause the more dense oil to migrate to radially outer portions of the flow paths due to centrifugal force during operation of the machine whereas the air tends to collect on the rotational axis of the rotor during such operation. As can be readily appreciated from a consideration of the Fig., if the air bubble becomes sufficiently large, it can impede the flow of the liquid coolant to the windings 24 and the coolant passages 48. In order to prevent such an occurrence, an air vent passage 54 extends axially through the rotor 22 along the rotational axis thereof. The air vent passage 54 has an extrance 56 in fluid communication with the inlet 26, and specifically, at the radially inner extent of the passages 46 on the rotational axis of the rotor 22. Similarly, the vent passage 54 is provided with an outlet 58 to the chamber 50 and also located on the rotational axis of the rotor 22. As a consequence of this construction, the pressure of incoming coolant at the inlet 26 will drive any forming air bubble into the inlet 56 to the vent passage and along the same to exit into the chamber 50 and be removed therefrom via the outlet 28. At the same time, the incoming liquid coolant, due to centrifugal force and the difference in densities, will drive any air in the chamber 34 radially inwardly toward the rotational axis and will spill over through the aperture plate 44 into the passages 46 to then flow through the passages 48 for the coolant and perform the desired cooling action.

In order to prevent any bypassing of the coolant passages 48 via the vent passage 54, the same has a cross sectional dimension that is but a minor fraction of the cross sectional dimension of the flow path defined by the coolant passages 48.

In the usual case, of the total flow of fluid, no more than about 10% will be entrained air. By using conventional compressible fluid flow calculations, the cross sectional dimension of the vent passage 54 may be determined. As a general practice, it should be chosen so that it will always be able to convey the maximum expected amount of entrained gas in the fluid being circulated and no more.

From the foregoing, it will be appreciated that a rotary electric machine made according to the invention eliminates the difficulties heretofore encountered when attempts have been made to cool rotor components in rotary electric machines by the flow of a coolant through the rotor. The unique construction assures that small contaminating particles in the coolant are adequately filtered so as to prevent ultimate clogging of coolant passages and yet assures adequate venting of air to prevent winding overheating.

I claim:

1. In a rotary electric machine, the combination of:
   a stator;
   a rotor journalled for rotation relative to the stator about an axis of rotation;
   electrical windings carried by said rotor;
   a fluid inlet on said rotor;
   a fluid outlet on said rotor spaced from said fluid inlet;
   means, including a cooling liquid flow path, in said rotor interconnecting said inlet and outlet, said liquid flow path being in heat exchange relation to said windings with at least a part thereof displaced from said axis of rotation; and
   a gas vent passage in said rotor interconnecting said inlet and said outlet and being located substantially on said axis of rotation.

2. The rotary electric machine of claim 1 wherein said vent passage is sized to prevent substantial flow of a liquid to thereby prevent bypassing of said liquid flow path.

3. The rotary electric machine of claim 1 wherein said inlet includes a chamber; a filter disposed in said chamber, and generally radially oriented entrance and exit ports for said chamber.

4. In a rotary electric machine, the combination of:
   a stator;
   a rotor journalled for rotation relative to the stator about an axis of rotation;
   electrical windings carried by said rotor;
   means defining a cooling liquid flow path in the rotor in heat exchange relation to said windings and displaced from said axis, said flow path having a liquid inlet and a liquid outlet; and
   a gas vent passage in said rotor in fluid communication with said liquid flow path and being located substantially on said axis of rotation, said gas vent passage having a cross sectional area that is a minor fraction of the cross sectional area of said liquid flow path to prevent substantial flow of liquid therethrough.

5. The rotary electric machine of claim 4 wherein said liquid flow path and said vent passage are in fluid communication with each other by a connection disposed substantially on said axis of rotation.

6. In a rotary electric machine, the combination of:
   a stator;
   a rotor journalled for rotation relative to the stator about an axis of rotation;
   electrical windings carried by said rotor;
   a fluid inlet on said rotor;
   a fluid outlet on said rotor spaced from said fluid inlet;
   means, including a cooling liquid flow path, in said rotor interconnecting said inlet and outlet, said liquid flow path being in heat exchange relation to said windings with at least a part thereof displaced from said axis of rotation; and
   a gas vent passage in said rotor interconnecting said inlet and said outlet, the connections of said gas vent passage to said inlet and said outlet being located substantially on said axis of rotation.

* * * * *